United States Patent [19]

Kittelson

[11] Patent Number: 4,575,800
[45] Date of Patent: Mar. 11, 1986

[54] SYSTEM FOR OPTIMIZING THE TIMING OF DIESEL OR SPARK IGNITION ENGINES

[75] Inventor: David B. Kittelson, Minneapolis, Minn.

[73] Assignee: Optimizer Control Corporation, Burnsville, Minn.

[21] Appl. No.: 529,287

[22] Filed: Sep. 6, 1983

Related U.S. Application Data

[63] Continuation-in-part of Ser. No. 483,188, Apr. 8, 1983, abandoned.

[51] Int. Cl.⁴ .......................... G05B 13/02; F02P 5/08
[52] U.S. Cl. ............................... 364/431.05; 123/419; 123/436
[58] Field of Search ............... 123/419, 418, 417, 416, 123/436, 480; 364/148, 149, 150, 151, 431.05, 431.08, 431.04

[56] References Cited

U.S. PATENT DOCUMENTS

| | | | |
|---|---|---|---|
| 4,026,251 | 5/1977 | Schweitzer et al. | 123/419 |
| 4,236,214 | 11/1980 | Sasayama | 364/431.04 |
| 4,306,284 | 12/1981 | Malcolm | 123/416 |
| 4,379,333 | 4/1983 | Ninomiya et al. | 364/431.05 |
| 4,428,342 | 1/1984 | Suzuki et al. | 364/431.05 |
| 4,448,171 | 5/1984 | Ninomiya et al. | 123/419 |
| 4,467,765 | 8/1984 | Suzuki et al. | 123/419 |
| 4,479,476 | 10/1984 | Suzuki et al. | 123/436 |

OTHER PUBLICATIONS

"Electronic Optimizer Control for I.C. Engine: Most MPG for any MPH" by P. Schweitzer et al., SAE, Feb. 75, Warrendale, Pa.

Primary Examiner—Parshotam S. Lall
Attorney, Agent, or Firm—Orrin M. Haugen; Thomas J. Nikolai

[57] ABSTRACT

An adaptive electronic control system in which a machine control parameter is oscillated (dithered) back and forth on either side of a given setting of such machine control parameter, with the period of the dithering being in synchronism with the natural cycle of the machine, whereby the changes in the control system's error signal due to normal speed changes of the machine itself are minimized or eliminated. When applied to a spark ignition of a gasoline engine or the injection timing on a diesel engine, the timing is advanced and retarded in synchronism with the rotation of the engine's shaft such that each phase of the dither cycle includes an equal number of complete engine cycles. The effect on engine speed occasioned by the dithering of the machine control parameter is then computed and an error signal is produced which is used to further adjust the parameter control setting in a direction to optimize performance of the machine. The system may be implemented by using a properly programmed microprocessor or, alternatively, can be implemented with discrete digital logic components.

23 Claims, 16 Drawing Figures

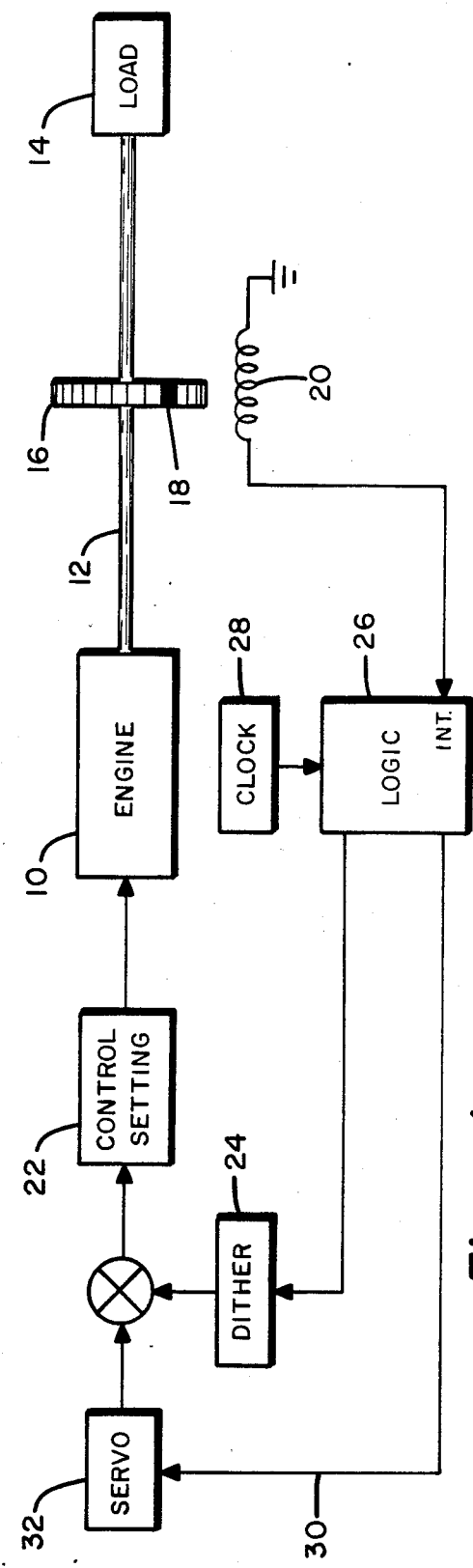
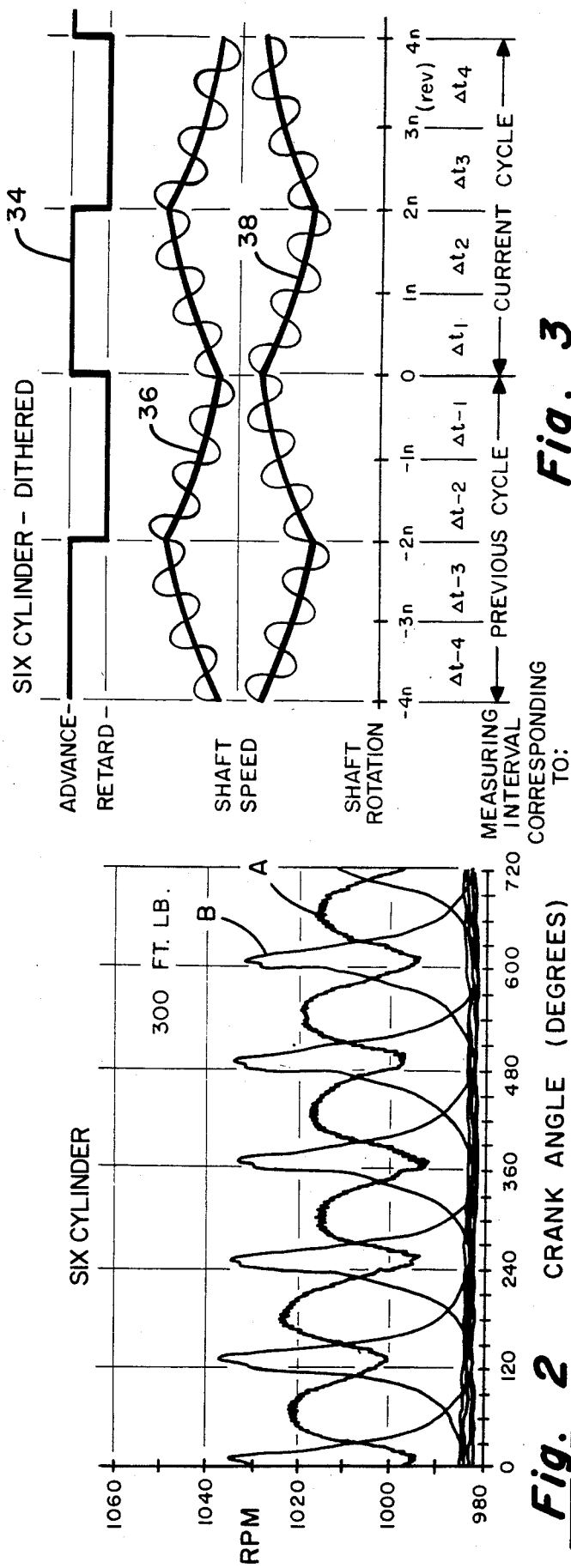
Fig. 1
Fig. 2
Fig. 3

MAIN ROUTINE

INTERRUPT HANDLER

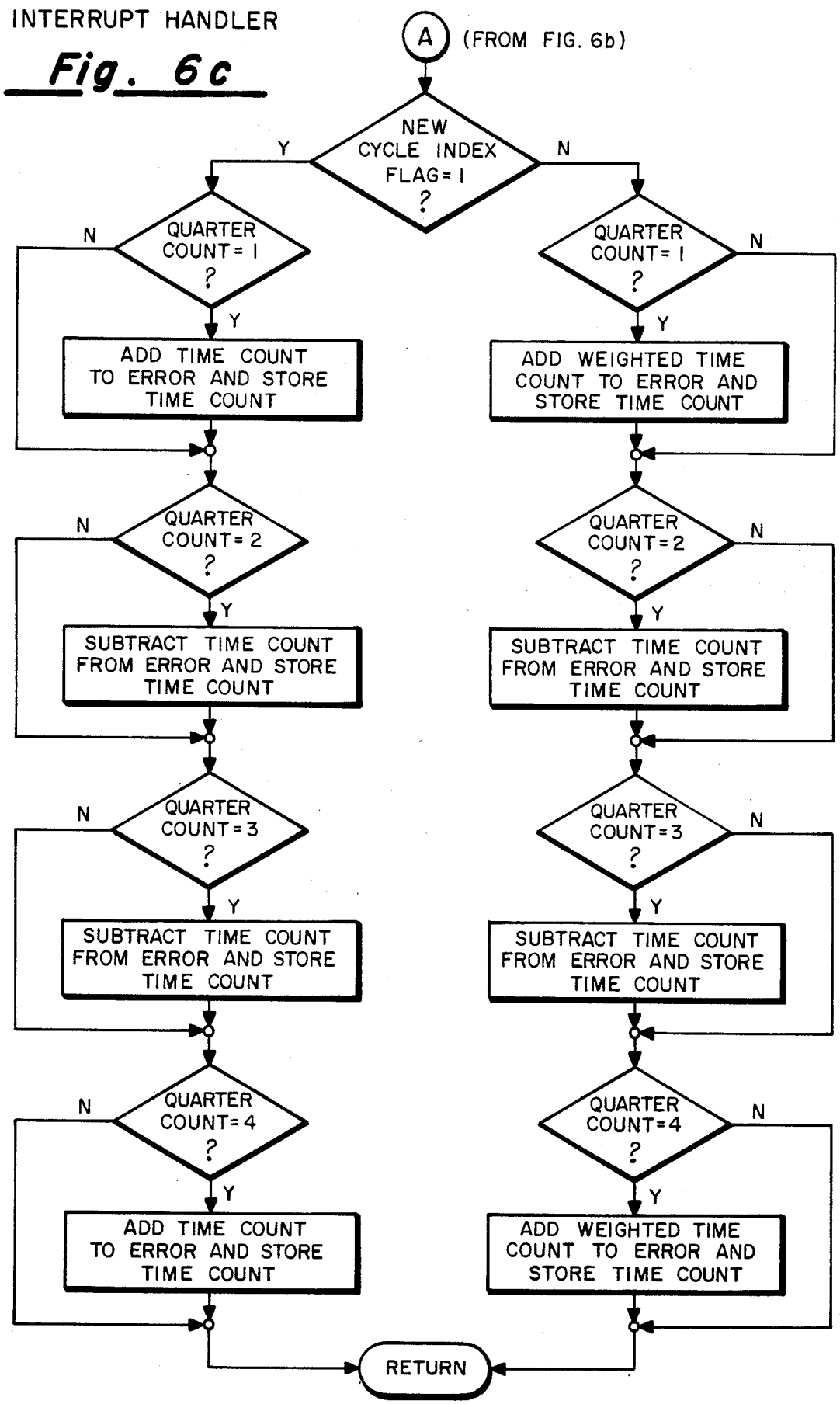
Fig. 6c  INTERRUPT HANDLER

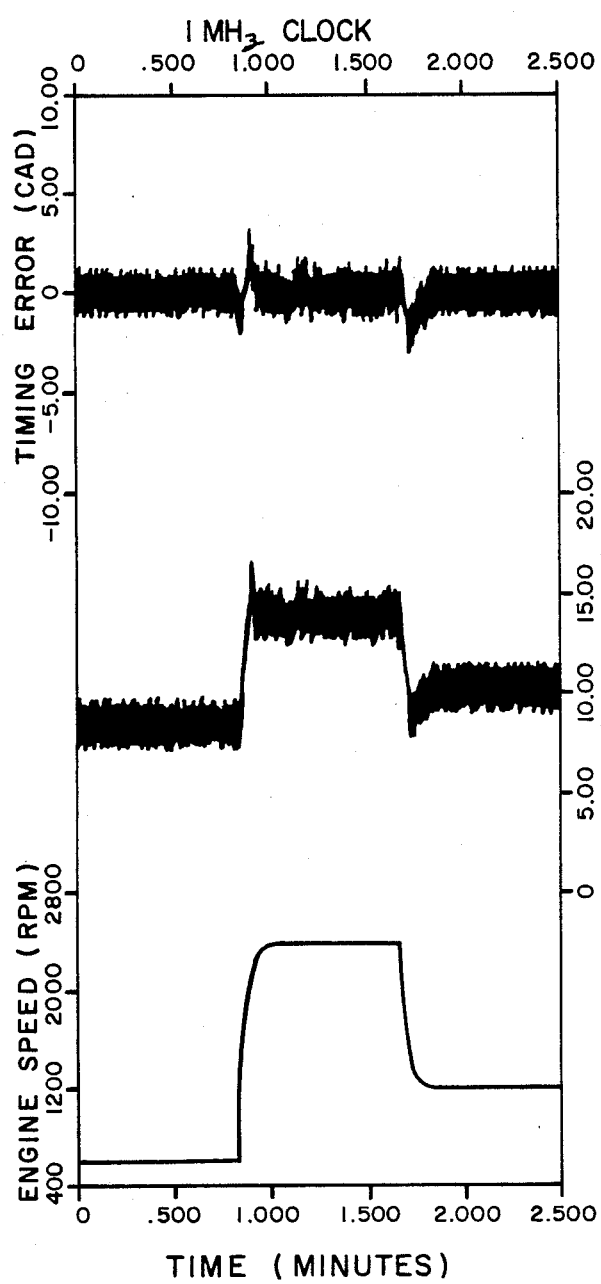 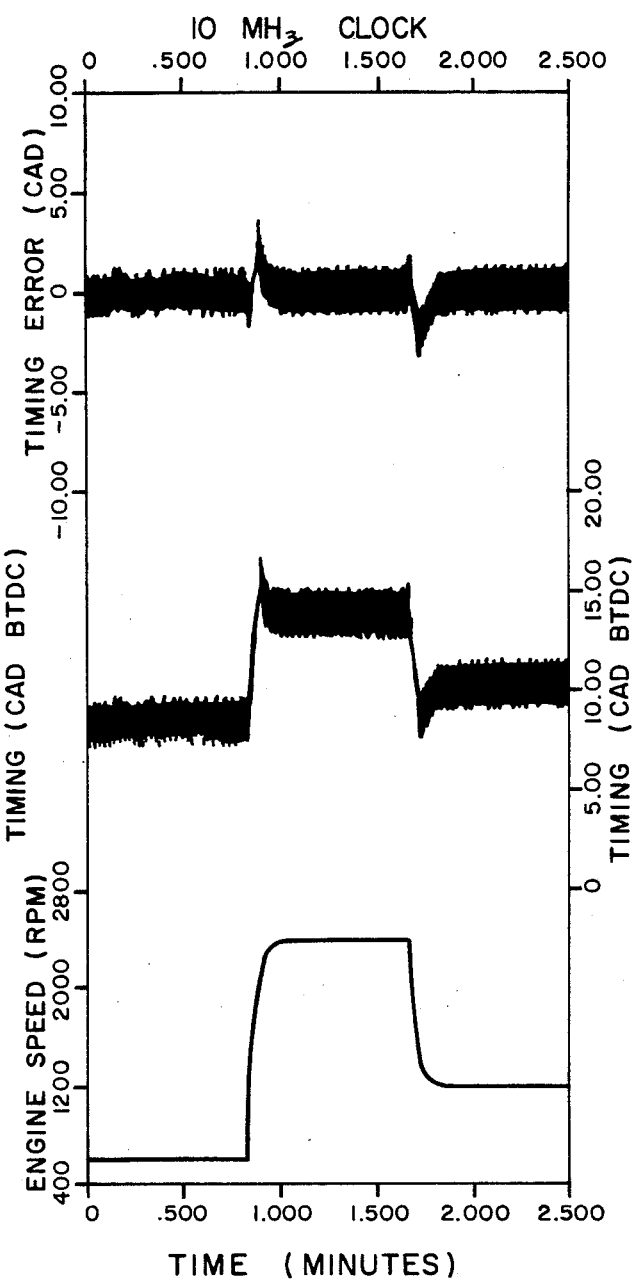
*Fig. 8a*  *Fig. 8b*

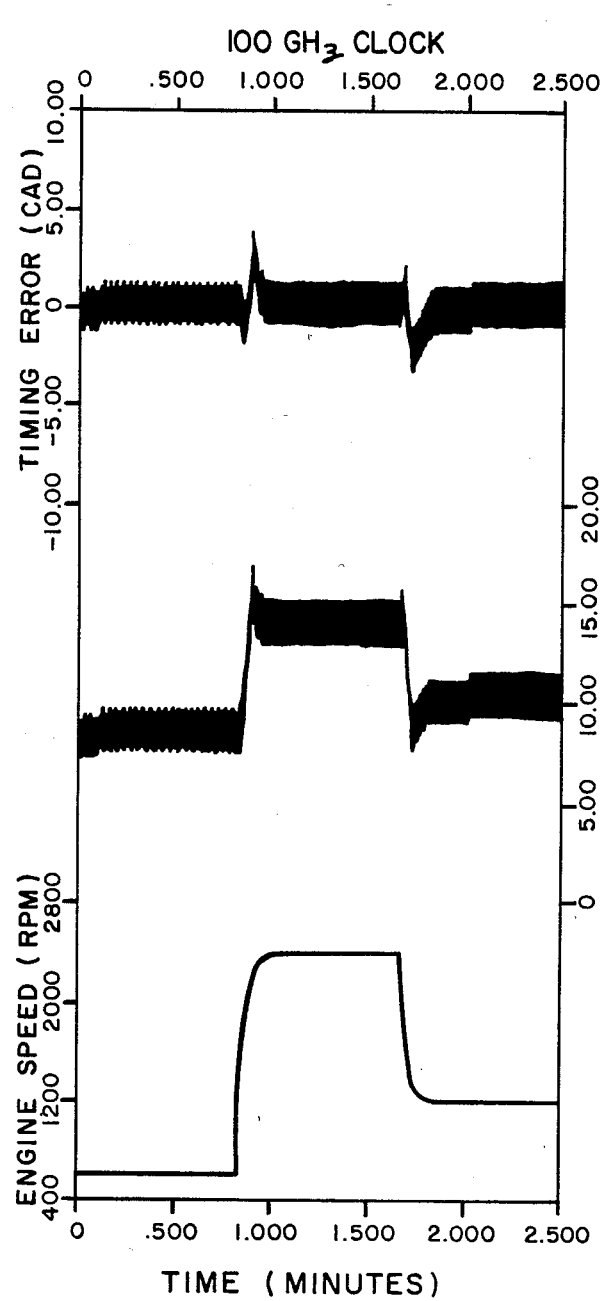
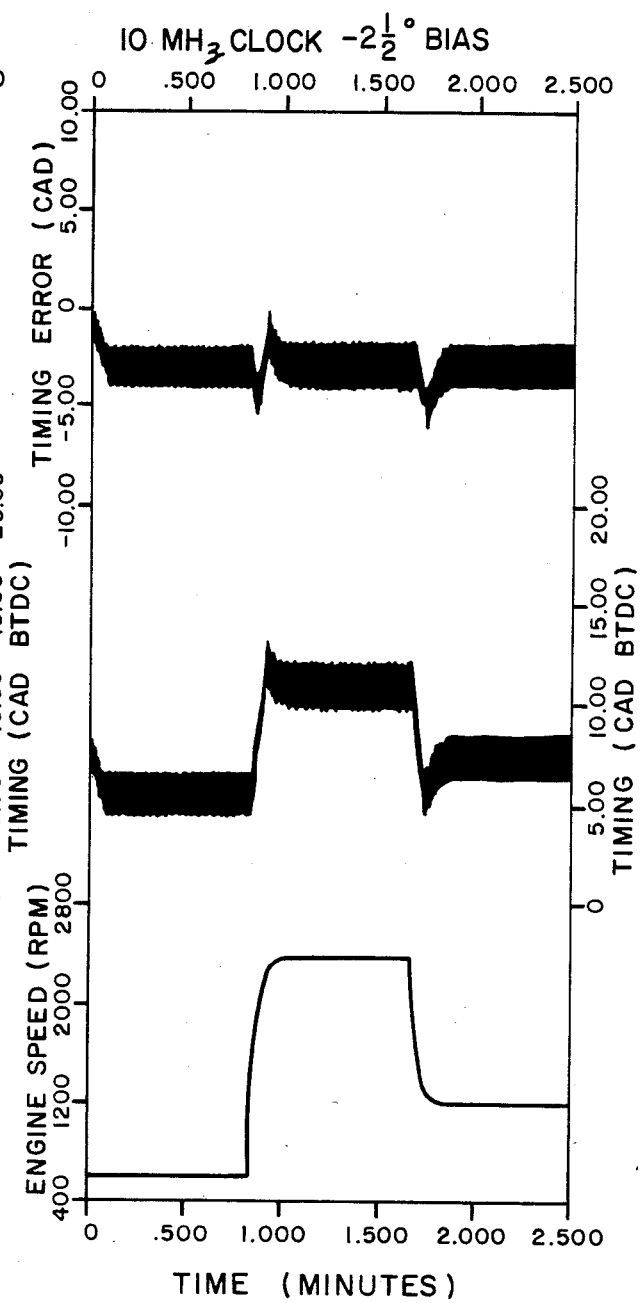
Fig. 8c
Fig. 8d

SYSTEM FOR OPTIMIZING THE TIMING OF DIESEL OR SPARK IGNITION ENGINES

CROSS-REFERENCE TO RELATED APPLICATION

This is a continuation-in-part application of application Ser. No. 483,188, filed Apr. 8, 1983, and entitled "System for Optimizing the Timing of Diesel or Spark Ignition Engines".

BACKGROUND OF THE INVENTION

1. Field of the Invention:

This invention relates generally to an adaptive control system for improving the performance of power producing machines such as internal combustion engines or the like, and more specifically to a closed-loop control system which remains stable over wide variations in engine speed settings.

2. Discussion of the Prior Art:

In the Schweizer et al. U.S. Pat. No. 4,026,251, there is described a closed-loop digital electronic control system for an engine in which a machine controlling parameter is perturbated (dithered) about a given setting and the performance of the machine is monitored to determine whether movement of the machine controlling parameter about the given setting improved or degraded the system's performance. Where a given movement of the setting resulted in improved performance, the resulting control signal developed by the electronic circuits is used to create a further movement of the control setting in the same direction. However, if the small change introduced results in degraded performance, then the machine setting is moved in the opposite direction.

In the device of the aforereferenced Schweitzer et al patent, engine performance is monitored by accumulating "celsig" pulses during predetermined segments of the dithering cycle. "Celsig" pulses are produced by the rotating engine shaft, flywheel or alternator and their rate of occurrence is proportional to engine speed. The control system logic utilizes a counting cycle which is divided into four quarters. Counting means are employed to count the number of "celsig" pulses in each quarter of the dither cycle. The counter is used to count up for the first quarter, down for the next two quarters and up again during the fourth quarter. The net number of counts remaining in the up/down counter at the end of each counting cycle is then used to determine whether to adjust the machine control parameter setting in one direction or the opposite direction. These corrections continue until no significant change in engine speed is produced by the dithering of the machine control parameter, indicating that the appropriate setting for maximum brake torque (MBT) has been located.

It has been found that the system works well provided that the number of "celsig" pulses is sufficiently large and that the dither period contains a large number of engine cycles, i.e., the engine rotational frequency is much larger than the dither frequency. However, if the engine frequency is not sufficiently larger than the dither frequency, loss of control may result.

It has been theorized that this loss of control is due to the fact that in the prior system, the dither pulses are asynchronous with respect to the engine cycle of the machine being controlled. That is to say, in the device of the aforereferenced Schweitzer et al. patent, the dither frequency is a fixed parameter and determined strictly by the electronic oscillator used to generate it. As such, the change-over from "advance" to "retard" or vice versa at the initiation of or midway through the dither period is independent of the rotation of the engine shaft and of the firing pulses acting upon the pistons. As a result, and as will be set forth in greater detail hereinbelow, the normal variations in engine speed between cylinder-to-cylinder firings may at some times be reinforced by the speed changes occasioned by the dithering of the machine's control parameter setting and, at other times, be in phase opposition with the speed changes produced by the dithering.

SUMMARY OF THE INVENTION

In accordance with the teachings of the present invention, the dither frequency is not fixed but, instead, is variable and synchronized with the machine'normal operating cycle. That is, each dither period begins with respect to a fixed shaft angle and each phase (advance and retard) of the dither period is comprised of an equal number of firing pulses. As such, the engine's cylinder firings do not continously move in and out of phase with respect to the dithering of the machine control parameter. Computer simulations have revealed that this synchronous dithering technique significantly reduces the error of the control system compared to the prior art system at all speeds and especially when the engine rotational frequency is of the same order or slightly smaller than the dither frequency.

In one embodiment of the invention, means are provided for sensing complete revolutions of the engine shaft, such as by providing a detectable mark on the engine's flywheel when a given engine cylinder is at top dead center. A stationary detector may then be used to produce an impulse each time the mark moves past the detector. Further means are provided for measuring the time required for the shaft to traverse a predetermined number of revolutions or portions thereof. In one implementation, a very high frequency oscillator may be used to produce regularly occurring pulses at, for example, a 10 megahertz rate. These pulses are accumulated in a counter which is enabled by a first signal from the rotation detector and disabled by a later traversal of the detectable mark past the stationary detector. By dividing the dither period into four segments and then accumulating the high frequency clock pulses in a bank of four counters, the values stored at the end of the dither period directly relate to the average speed of rotation during those four segments. Logic means are then provided for comparing the average speed values during the first and fourth segments with those during the second and third segments and, based upon the algebraic sign of the difference of sums, a control signal is developed which, when applied to the transducer associated with the machine's control parameter setting, moves that setting by a predetermined amount in a direction calculated to improve the system's performance.

Alternatively, proportional control can be developed wherein the size of the correction step is directly related to the magnitude of the error signal rather than merely its polarity. The algorithm of the present invention may be implemented using discrete logic components as suggested above or, alternatively, may be achieved through proper programming of a microprocessor.

In the Schweitzer et al. U.S. Pat. No. 4,130,863 mention is made of the fact that, in certain circumstances, it is desirable that the adaptive control system causes the machine to operate at a point displaced from MBT. The arrangement whereby off-optimum operation is attained is referred to as "biasing". Biasing is equally applicable in the present invention, irrespective of whether a discrete logic implementation or a miocroprocessor implementation is employed.

As has been already indicated, in the control system constructed in accordance with the present invention, each phase of the dither period, i.e., the advance phase and the retard phase, are comprised of an equal number of engine cycles or power pulses and each such dither phase is synchronized to begin and end in a fixed phase relationship to such cycles or pulses. It has been found that improved control can be achieved where the number of such engine cycles or power pulses per dither phase can be selected as a function of engine rpm. Thus, for example, when the engine speed is in the range of from 0 rpm to 2,000 rpm, it is preferred that each phase of the dither cycle include two revolutions of the shaft (one complete engine cycle for a four-stroke cycle engine) whereas, when the engine speed is in the range of from 2,000–4,000 rpm, then each pulse of the dither cycle should include four revolutions. This allows more clock pulses to be accumulated in each dither phase and thus leads to a more accurate determination of the error signal. Furthermore, it gives relatively more time for the engine to respond to timing changes which also leads to a larger, more easily measured error signal. Of course, other equal numbers of revolutions per dither cycle can be used at higher rpm values.

In applying the method and apparatus of the present invention to a diesel engine, certain calibration steps are required to compensate for differences in timing of the fuel injector devices themselves. Electronically actuated diesel fuel injectors and injection valves have associated with them mechanical or electrical delay times which can vary from unit to unit. Hence, if a fuel injection system with accurate timing control is desired, a suitable means must be provided for dealing with individual differences between injectors.

The method and apparatus of the present invention permits overall optimization of the timing of a diesel or spark ignition engine. Where, however, significant differences exist between the time lags associated with individual fuel injectors and these differences are not taken into account, considerable cylinder-to-cylinder timing differences may result. This can cause high emissions and degraded fuel economy. The apparatus and method of the present invention can obviate this problem by allowing optimization of the timing of the individual cylinders whereby the relative phase lags between injectors can be determined. Knowing the individual timing differences, suitable control circuitry can be devised for compensating for variations in injector performance characteristics.

OBJECTS

It is accordingly a principal object of the present invention to provide an improved adaptive control system for use with power producing machines.

Another object of the invention is to provide an adaptive control system of the type in which a machine control parameter is oscillated back and forth about a given setting and a control signal is produced in accordance with whether the small change introduced improves or degrades performance.

A still further object of the invention is to provide an adaptive control system in accordance with the foregoing objects in which the oscillations of the machine control parameter setting are synchronized with the natural engine cycles of the machine being controlled.

Yet another object of the invention is to provide an adaptive control system of the "dithering" type in which the dither frequency is variable rather than fixed.

A yet further object of the invention is to provide an adaptive control system of the "dithering" type in which each phase of the dithering cycle includes an equal number of machine cycles and is in synchronism with such machine's cycles.

Yet another object of the invention is to provide an adaptive control system in which the number of machine cycles per phase of the dithering cycle is dependent upon the engine speed at which the machine is functioning.

A yet still further object of the invention is to provide a method and apparatus for optimizing the timing of individual cylinders in order to determine relative phase lags between plural injectors used in a mutilicylinder diesel engine.

These and other objects and advantages of the invention will become apparent to those skilled in the art from the following detailed description of the preferred embodiment, especially when considered in conjunction with the accompanying drawings.

DESCRIPTION OF THE DRAWINGS

FIG. 1 is a general block diagram of an adaptive control system in accordance with the present invention:

FIG. 2 is a wave form showing the natural speed variations of a six cylinder internal combustion engine over one complete engine cycle;

FIG. 3 is a set of wave forms illustrating a "dither" cycle and the resulting speed variations occasioned by the act of dithering assuming a six-cylinder engine and one engine cycle per dither phase;

FIGS. 6(a) through 6(c) together depict by a flow chart the manner in which the microprocessor of FIG. 5 is programmed in accordance with the present invention;

FIGS. 8(a) through 8(f) are wave forms illustrating the variation of timing and timing error with speed changes obtained with the electronic control system of the present invention under different conditions of bias and clock rate.

DESCRIPTION OF THE PREFERRED EMBODIMENTS

Figure 4:
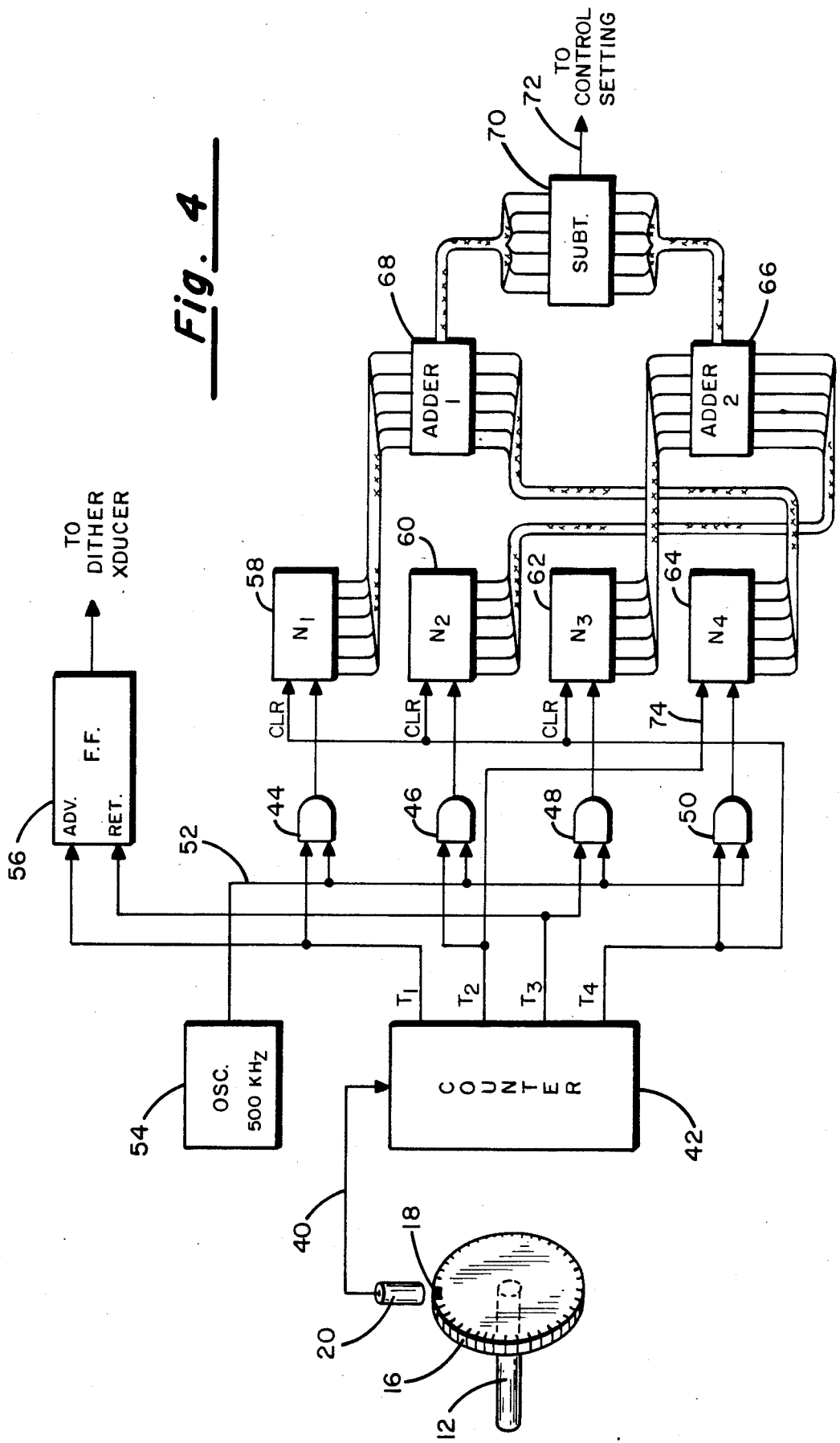
FIG. 4 is a logic diagram showing the way in which the present invention can be implemented using discrete logic elements.

FIG. 1 is a simplified block diagram of the adaptive control system of the present invention. In this figure there is illustrated, for exemplary purposes only, an internal combustion engine 10 having an output shaft 12 coupled to load 14. Affixed to the shaft is a flywheel 16. Located on the periphery of the flywheel 16 is a detectable mark such as a permanent magnet 18 which, as it rotates past the stationary detector 20, generates a voltage signal. One such pulse-type signal is produced for each revolution of the flywheel 16.

Also associated with the engine 10 is a control setting 22 which may take a variety of forms depending upon the nature of the machine being controlled. For example, in a gasoline burning engine, the control setting 22 may be the timing of the distributor whereas in a diesel fuel burning engine, the control setting 22 may relate to the injection timing mechanism of the engine. The block 24 labeled "Dither" is an electrical or electromechanical device which is effective to perturbate the control setting 22 so as to introduce a predetermined variation in the machine control setting from its nominal value. Whereas in the Schweitzer et al. U.S. Pat. No. 4,026,251 (as well as in the earlier Schweitzer et al. U. S. Pat. No. 3,142,967, the subsequent Schweitzer et al. U.S. Pat. No.4,130,863 and the Malcolm Pat. No. 4,306,284) the period of the dither cycle is fixed in duration and has no particular relationship to the firing time of the individual engine cylinders, in the present invention, a digital logic device 26 under control of the rotation sensors 18-20 causes the control setting 22 to be moved back and forth in synchronism with the individual firing pulses developed in the engine 10. The time taken for the engine shaft 12 to move through a predetermined integral number of rotations during each phase of the dither period is measured by capturing regularly occurring high frequency clock pulses from a clock source 28 in suitable storage registers under control of the rotation sensors 18-20. Once a dither cycle is completed, a comparison is made between an estimate of what the average speed would be in the second and third quarters of the dither period if the timing were not dithered, i.e., left retarded, and the actual speed in these two quarters. The simplest estimate of this speed may be obtained by taking the average of the first and fourth quarter speeds. Such an estimate is sufficiently accurate for engine operation at steady speeds or during slow speed transients. During rapid speed transients, a more accurate estimate may be obtained by using values of first and fourth quarter speeds from previous dither cycles. Based upon the comparison, the logic unit 26 develops an error signal on the line 30 which, acting through a servo mechanism 32, causes an adjustment of the control setting 22. The device 32 may be entirely electronic in nature or, alternatively, may be an electromechanical device.

Where it is desired to apply the optimization algorithm of the present invention to individual injectors rather than across all cylinders of a diesel engine, the engine is made to operate at a constant fueling rate and thus, at an approximately constant speed, preferably at a fast idle. Next, the timing of an individual injector is the control setting 22 to be dithered in synchronization with the crank shaft rotation. The timing of all remaining injectors would remain fixed. Again, once a dither cycle is completed, a comparison is made between the average speed of the output shaft in the second and third quarters of the dither period had the injection timing of the selected injector not been dithered and the actual speed of these two quarters. The logic unit 26 again develops an error signal which, acting through the servo mechanism 32, causes an adjustment of the selected injectors timing.

Referring next to FIG. 2, there is shown, for purposes of illustration, a graph illustrating variations in engine speed (curve A) and cylinder pressure (curve B) through two revolutions (720 crank angle degrees) for a six cylinder engine. Thus, the graph of FIG. 2 illustrates one complete engine cycle comprising the individual firing of the six cylinders. It can be noted that as the pressure in the cylinder rises (curve B) the shaft speed (curve A) decreases. Upon firing and the resulting reversal of the piston stroke, the pressure drops as the shaft speed increases. Then, as the next piston in the firing order begins to move up within its cylinder to compress the air/fuel mixture in its cylinder, the pressure in the cylinder again climbs as the shaft speed decreases. It can be seen, then, that the speed curve (curve A) is somewhat sinusodial but that there are speed variations between the various cylinder firings as reflected by the difference in height of the individual maxima of the speed curves.

Because of the natural variation in speed of the engine shaft, asynchronous dithering of the engine's control setting at times may result in the reinforcement of a speed increase or, alternatively, may detract from that speed increase. Similarly, a retard of the control setting may, at one time, result in a reduction in a speed increase or the reinforcement of a speed decrease. In fact, it was found through experimentation that the control system reflected in the aforereferenced Schweitzer et al. patents and the Malcolm patent would, at times, lose its ability to track and the error signal applied to the servo would wander in an uncontrollable fashion.

Figures 7A, 7B:
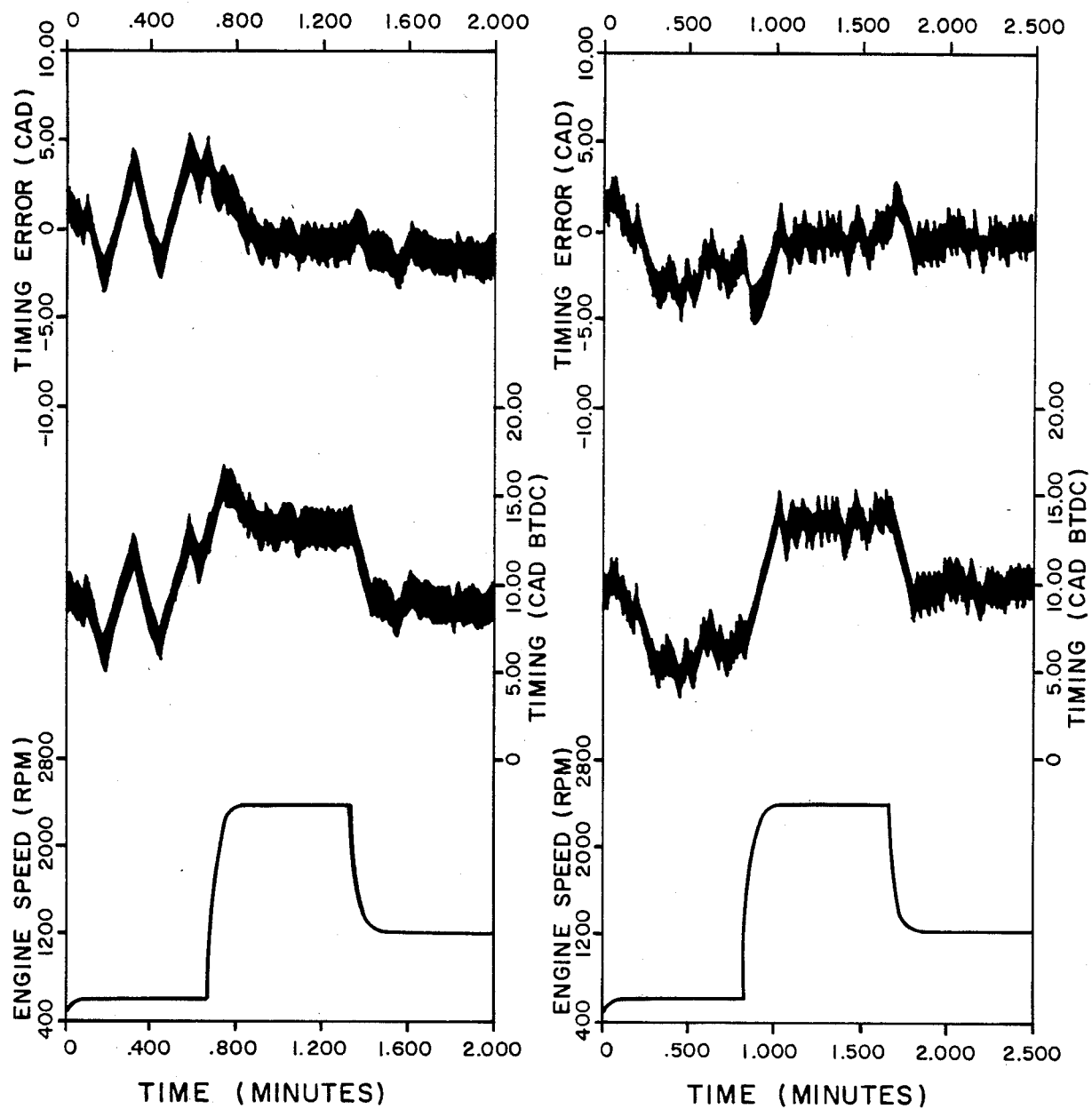
FIGS. 7(a) and 7(b) are wave forms illustrating the variation in timing and timing error as a function of engine speed for the prior art asynchronously dithered electronic control system.

FIGS. 7(a) and 7(b) illustrate the variations in timing error measured in crank angle degrees (CAD) and variations in the timing itself as a result of shifts in engine speed with the adaptive electronic control system of the prior art in use. It is to be noted that at low RPM values there are extreme variations in timing and timing error with the control wandering back and forth about the zero RPM error position. At higher RPM values, the timing error remains fairly constant but still exhibits fluctuations which cannot be attributed strictly to the fact that the control parameter is being dithered. Also, it may be noted that the timing and timing error undergo a significant transient variation upon acceleration and deceleration. The curve of FIG. 7(a) has been plotted using a fixed dither frequency of 4 Hz. FIG. 7(b) is a similar set of curves for the prior art control system when a 2 Hz dither frequency is involved. Again, the timing error is found to wander excessively at low engine RPM.

In accordance with the present invention, rather than dithering the machine control parameter at a fixed frequency, the dither period is synchronized to the normal engine's cycle. Thus, an integral number of firing pulses (curve B in FIG. 2) occurred during each half cycle of the dither period and the beginning and ending of the dither cycle are made to occur in synchronism with the appropriate engine's cylinder firing.

Referring next to FIG. 3, numeral 34 refers to the dither wave form. Assuming that the engine involved is a four-stroke engine, one complete engine cycle consists of two revolutions of the output shaft. The dither period is comprised of two phases, i.e., the advance phase and the retard phase. Each phase is made to contain an integral number of individual cylinder firing pulses and each phase is in synchronism with those firing pulses.

The wave forms 36 and 38 in FIG. 3 illustrate the shaft speed during the advance and retard phases of the dither cycle 34. If the machine setting is retarded with respect to MBT, then, during the advance phase the shaft speed increases but during the retard phase the shaft speed decreases. This results in wave form 36 of FIG. 3. On the other hand, if the machine control parameter setting is advanced with respect to MBT, further advancing of the setting during the first half of the dither cycle results in a speed decrease while retardation in the second phase of the dither cycle causes a speed increase. This characteristic is represented by the curve 38 in FIG. 3.

As will be explained in greater detail, in implementing the control system of the present invention, it has been found expedient to divide the dither period into a plurality of segments. Specifically, and as is reflected in FIG. 3, the dither perior is divided into four such segments, each being a predetermined integral number of shaft rotations. The logic device 26 includes means for measuring the time required for the rotational intervals $\Delta t_1, \Delta t_2$, etc.

In carrying out the control function in its simplest form, the logic 26 determines whether the speed at the center of the dither cycle is greater than or less than the speed at the edges of the dither cycle. More specifically, the time for the integral number of revolutions taking place during the first quarter and the last quarter of the dither period are summed together and from that sum is subtracted the sum of the average revolution times occurring during the second and third quarters of the dither cycle. If the resulting value is positive, it is known that advancing the machine control setting improves performace. However, if the difference in sums is negative, it is known that the dithering worsens performance and that the parameter setting should be retarded with respect to its then present setting. Leaving out for the moment the concept of biasing, this error equation may be expressed mathematically by the equation:

$$E = (\Delta t_1 + \Delta t_4) - (\Delta t_2 + \Delta t_3) \quad (1)$$

Where $\Delta t_1, \Delta t_2 \ldots \Delta t_4$ are average rotation times during the four quadrants of the dither period as indicated in FIG. 3.

Whereas in the prior art adaptive control systems described in the aforereferenced Schweitzer et al. patents and the Malcolm patent, shaft speed was measured by counting the number of so-called "celsig" pulses occuring during fixed portions of the dither cycle, in accordance with the present invention, since the dither cycle is synchronized with the rotation of the engine's shaft, average speed can be determined by counting the number of high frequency clock pulses entered into a digital counter during predetermined numbers of revolutions of the output shaft. Replacing the "celsig" pulse generator of the prior art with a high frequency electronic oscillator or clock source should reduce the cost of the system as well as improve its performance. Referring to FIG. 4, there is shown the manner in which the adaptive control system of the present invention can be implemented using discrete logic components. As is illustrated, the engine's shaft 12 drives a flywheel 16 having a magnetic element 18 disposed on the periphery thereof for cooperating with a pick-up coil 20. Thus, each revolution of the flywheel is accompanied by the generation of an electrical impulse on the conductor 40. While a magnet and magnetic pick-up combination has been found to yield satisfactory results, those skilled in the art will recognize that other means are available for producing an electrical signal when a fixed point on a rotating flywheel passes a predetermined stationary sensor. Hence, the invention is not to be construed as being limited to a magnetic pick-up.

The signals appearing on line 40 are applied to the count input terminals of a four-stage counter 42. The outputs of the individual stages labeled $t_1$ through $t_4$ are individually coupled to first inputs of gating circuits 44, 46, 48 and 50. The second input to these aforementioned gates comes by way of conductor 52 from the output of a high frequency oscillator 54. The output from stages $t_1$ and $t_3$ are also connected through a leading edge triggered set/reset type flip-flop 56 whose output goes to a transducer (not shown) cooperating with the engine's control setting device 22.

Associated with each of the coincidence circuits 44 through 50 is a multi-stage binary counter as at 58, 60, 62 and 64. The outputs from counters 58 and 64 are applied in parallel to a first full adder circuit 68 while the parallel outputs from the counters 60 and 62 are applied as inputs to a second adder array 68. The outputs from the adder arrays 66 and 68 are then applied as inputs to a subtraction network 70 and, depending upon the results of the subtraction performed, the signal appearing on output line 72 is either positive or negative. This signal may be applied to a suitable electronic device for making a step-wise adjustment in the machine control parameter setting where the direction of the step is determined by the plurality of the output signal on line 72.

With reference to FIGS. 2, 3 and 4, an explanation will now be given as to the manner in which the implementation shown in FIG. 4 may be used to control the operation of an internal combustion engine. The pick-up device 20 is mounted on the frame in a copperative relationship with the flywheel 16 or other component on the engine shaft rotating in synchronization with the engine such that on each successive revolution of the flywheel 16, an electrical pulse will be created on the line 40 in synchronism with the engine's firing cycle. It is assumed that the counter 42 is originally cleared and the leading edge of the pulse on line 40 will cause the counter to advance to its $t_1$ state. When in this condition, the flip-flop 56 will be switched to a state causing the dither device to advance the control setting of the engine relative to its then current position. At the same time, the $t_1$ output from the counter 42 enables the gate 44, allowing the high frequency clock pulses from the oscillator 54 to pass therethrough and be accumulated in the counter stage 58. At the completion of the first revolution of the flywheel 16, another impulse will be produced on the conductor 40 to advance the counter 42. That is to say, the counter 42 switches to its $t_2$ state. When in this condition, the gate 44 is disabled preventing any further clock pulses from being entered into the counter 58. Gate 46 will now be enabled, however, and the clock pulses from the oscillator 54 will pass therethrough and be accumulated in the counter 60. This continues until another complete revolution of the flywheel takes place when state $t_3$ of the counter 42 goes active. The setting of the counter 42 to its $t_3$ state performs two functions. First of all, a signal is presented to the reset terminal of the leading edge triggered flip-flop 56 and it reverts to its "retard" state, causing its output to ultimately cause a shift in the setting of the machine control parameter in a retard direction relative to its then nominal setting. Secondly, gates 44 and 46 are disabled while gate 48 is enabled to allow clock pulses from the oscillator 54 to be accumulated in the counter 62. Following one more revolution of the flywheel 16, the counter 42 is switched to its $t_4$ state, wherein all but gate 50 are disabled, and it is the counter 64 which then receives clock pulses from the oscillator 54 during one full revolution of the engine's output shaft.

With the arrangement shown in FIG. 4, at the end of four revolutions of the flywheel 16, the counters 58 through 64 will contain values inversely proportional to the average speed of rotation of the output shaft during the four separate intervals indicated in the wave forms of FIG. 3. While not specifically shown in the block logic diagram of FIG. 4, temporary holding registers are also be provided for storing the count values for subsequent arithematic operations during the time that the counters 58 through 64 are cleared of their previous values in anticipation of the receipt of further timing pulses on subsequent rotations of the flywheel. Thus, counters 58, 60 and 62 can be cleared immediately upon the initiation of the $t_4$ period of the counter 42 and, subsequently, on the initiation of the following $t_2$ period, a clear pulse may be applied over the line 74 to the counter 64 to clear it out in anticipation of the receipt of further timing pulses from the oscillator 54 on the then current computational cycle.

The values accumulated in the counters 58 through 64 during a first full dither cycle may then be summed in the adder networks 66 and 68 during the next succeeding dither cycle. In accordance with the error equation set forth above, the contents of counters 60 and 62 corresponding to the average time for rotations at the center of the dither cycle are combined in adder 68 while the contents of the counters 58 and 64 corresponding to the average time for rotations of the shaft at the edges of the dither period are combined in adder 66. The subtractor 70 then operates on the sum representing signals developed in adders 66 and 68 and a determination is made as to whether the average time at the center of the dither cycle is greater than or less than that existing at its edges. This is reflected by the plurality of the signal appearing at the output 72 of the subtractor 70.

It is to be understood that the discrete logic implementation illustrated in FIG. 4 is only one way of implementing a system for solving the speed equation and persons of ordinary skill in the art will be able to devise other logic arrangements for accomplishing the same end. Also, this implementation does not specifically treat biasing the error signal, but that can be accomplished, as well, using discrete logic. It is important to note, however, that the system of the present invention is different from the prior art in that the dither period is made to operate in synchronism with the rotation of the engine shaft and that average times for each revolution of the shaft is determined by accumulating regularly occurring outputs from a stable oscillator (oscillator 54) rather than "celsig" pulses generated by a transducer associated with the engine's output shaft. This permits a much higher degree of resolution of speed measurements than was obtainable using the prior art approaches as reflected in the aforereferenced Schweitzer et al and Malcolm patents.

Those skilled in the art will also recognize that much greater flexibility can be achieved by employing a programmed microprocessor as the logic element 26 of FIG. 1 rather than the discrete digital logic implementation reflected by FIG. 4. The way in which the present invention may be implemented and practiced using a programmed microprocessor will next be considered.

Figure 5:
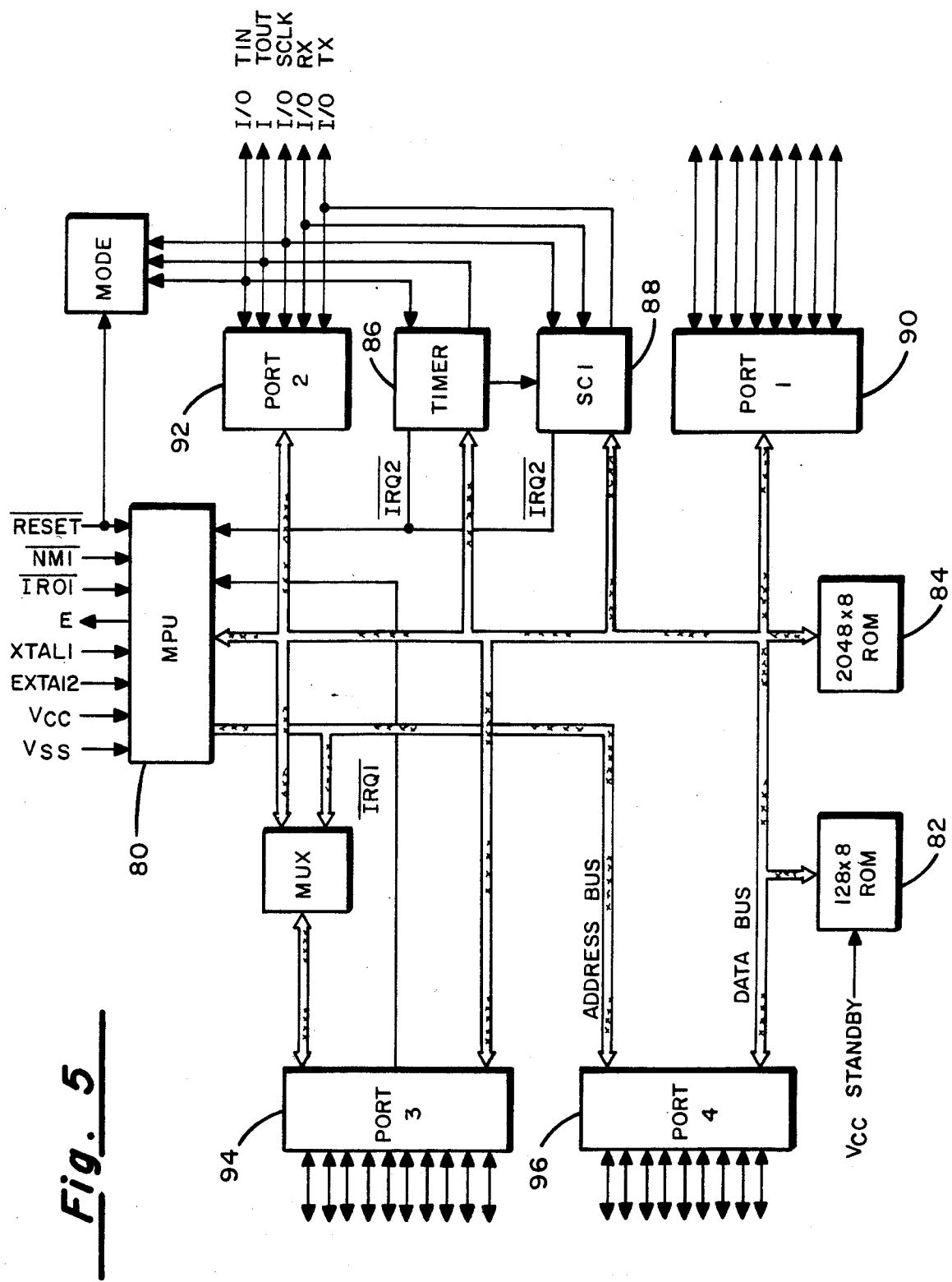
FIG. 5 is a block diagram of a microprocessor which may be programmed to carry out the control algorithm in accordance with this invention.

In FIG. 5 there is shown by means of a general blocked diagram the architecture of the Motorola MC6801 Microcomputer. It comprises a single-chip NMOS device in which the microprocessing unit 80 and its associated RAM 82 and ROM 84 are all disposed on the same silicon chip as are its own internal timer 86, its serial communications interface 88 and input/output ports 90, 92, 94 and 96. The MC6801 Microcomputer System is able to operate in any one of three fundamental operating modes. More specifically, it can function as a single-chip device in which only on-chip resources are utilized and where the number of available input-/output lines is maximized. Alternatively, it can be made to function in the so-called "expanded, non-multiplexed mode" in which external memory or other devices may be addressed for reading and writing via separate address and data buses. Finally, in the so-called "expanded multiplexed mode", the address and data buses are time-multiplexed, yielding a 64 K byte address space while requiring only a simple latch to de-multiplex the bus. In that the application to the present invention does not impose strenuous memory requirements, the device can be operated in the first or single-chip mode.

The programmable timer feature of the MC6801 can advantageously be used in applying that microprocessor to the control system of the present invention. The timer 86 comprises a 16-bit, free-running counter which is incremented by a crystal control clock within the MPU 80. The counter can be read by the MPU and an overflow flag is set each time that the 16-bit counter contains all ones. Thus, it can be used to measure elapsed time between two events, e.g., successive pulses from the flywheel transducer.

Complete details concerning the architecture, features, programming and applications of the Motorola MC6801 Microcomputer are set forth in a Motorola, Inc. publication entitled "MC6801 8-Bit Single-Chip Microcomputer Reference Manual", copyright 1980, and those desiring more detailed information concerning its instruction repertoire, operating times, addressing formats and programming approaches are referred to that publication.

Figure 6A:
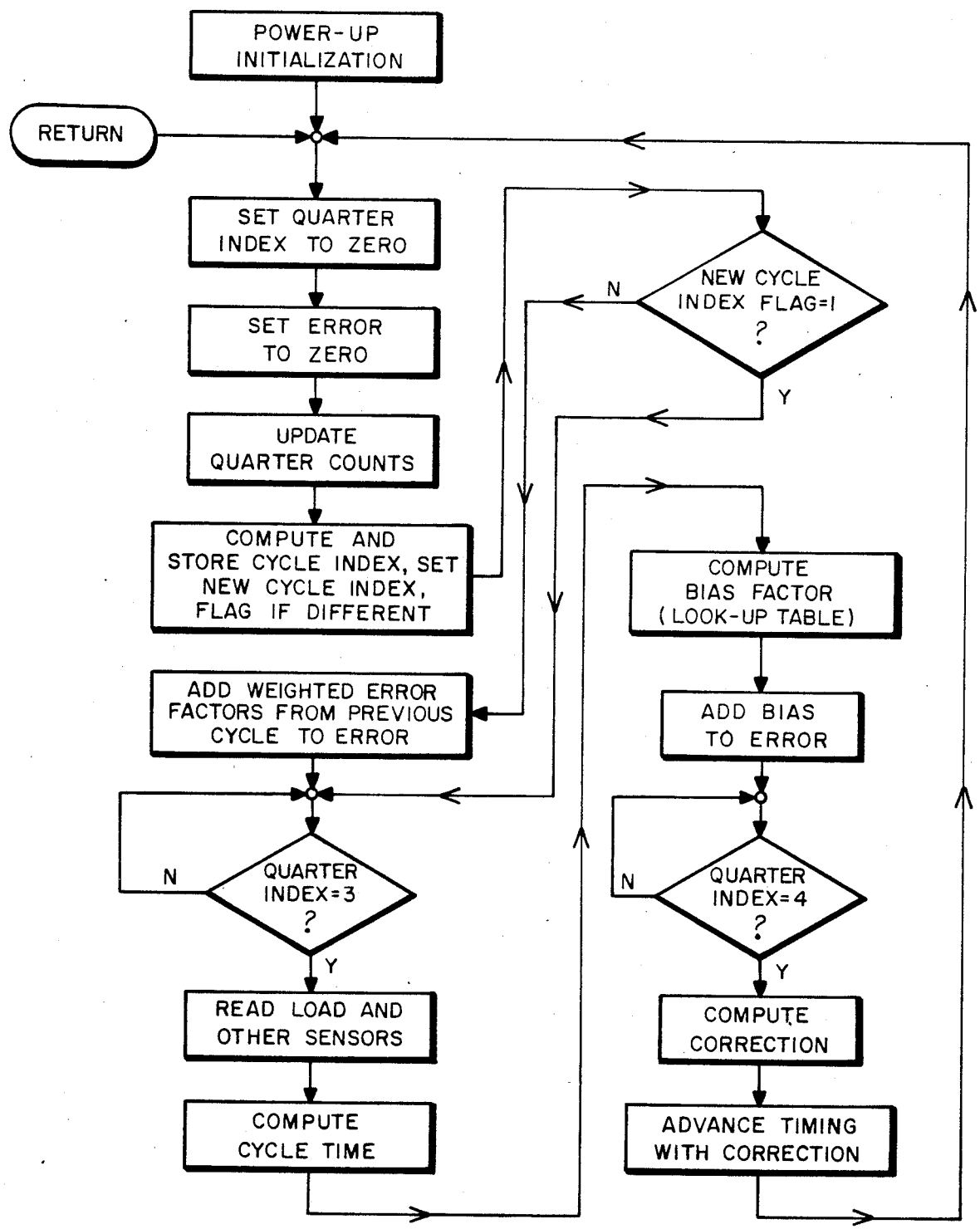
Figure 6B:
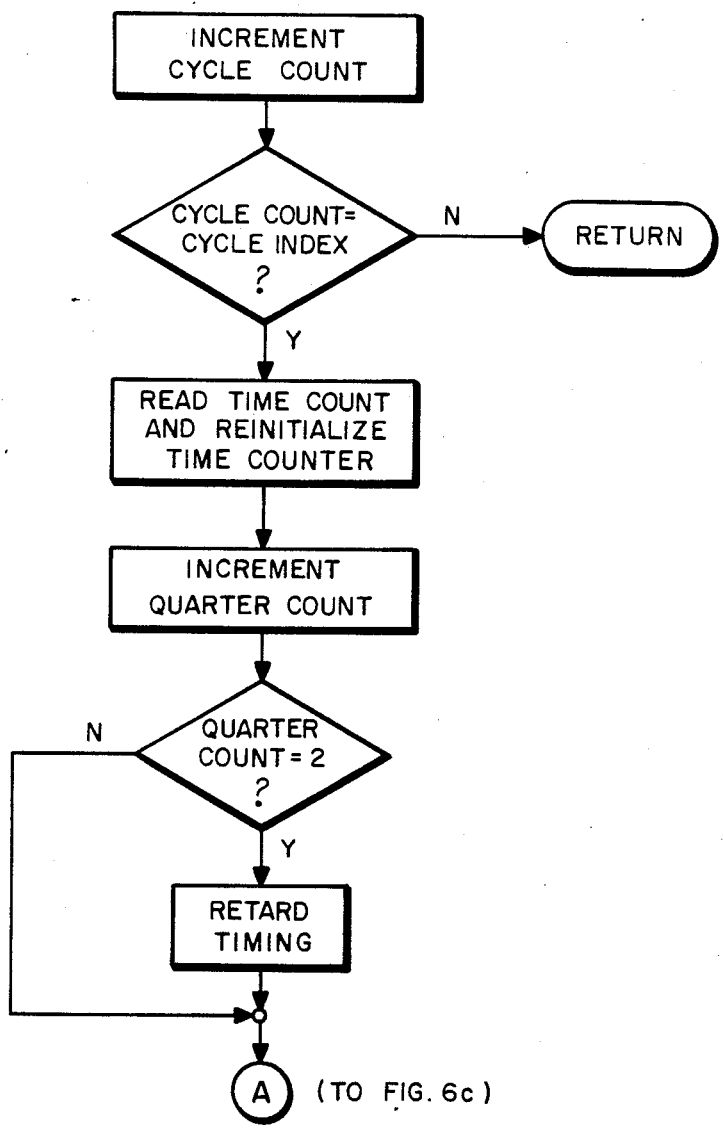

FIG. 6(a) is a flow chart showing the manner in which the microprocessor may be programmed to compute the error signal in synchronization with the rotation of the engine shaft. The computer is programmed to calculate the error using the error equation:

$$E = \Delta t_{\overline{CD}} - \Delta t_{CD}$$

where $\Delta t_{\overline{CD}}$ is the time that would be required for the center two quarters of the dither cycle if the timing were not dithered (advanced), and $\Delta t_{CD}$ is the measured time for the same two quarters in the presence of dithering, i.e., $\Delta t_2 + \Delta t_3$. The simplest version of the system, $\Delta t_{\overline{CD}}$, is taken as $\Delta t_1 + \Delta t_4$. This is adequate when the engine speed is constant or changing slowly. However, if the speed is changing rapidly, a more accurate estimate of $\Delta t_{\overline{CD}}$ can be obtained by using information from previous dither cycles. For example, if a fourth order polynominal is fit to the relationship between time and engine rotation using $\Delta t_{-4}$, $\Delta t_{-1}$, $\Delta t_1$ and $\Delta t_4$ (see FIG. 3), a more accurate estimate of $\Delta t_{\overline{CD}}$ may be found and is given by:

$$\Delta t_{\overline{CD}} = A\Delta t_{-4} + B\Delta t_{-1} + C\Delta t_1 + D\Delta t_4$$

where A, B, C and D are constants determined by the fit. A bias term may be added to the error equation to cause the system to operate either somewhat advanced or retarded of MBT. Thus, the final error equation becomes:

$$E = A_4\Delta t_{-4} + B_4\Delta t_{-1} + C_4\Delta t_1 + D_4\Delta t_4 - \Delta t_2 - \Delta t_3 + \text{bias}$$

where the bias may be obtained from a look-up table. A bias value proportional to $(\Delta t_1 + \Delta t_2 + \Delta t_3 + \Delta t_4)^2$ will produce an approximately constant degree of advance or retard from MBT. The microprocessor executes the instructions in the Main Routine depicted in FIG. 6(a) until the rotation sensor 18-20 detects the passage of a reference mark past the stationary detector device. Upon each such event, the detector device generates an interrupt signal which is applied to the microprocessor input terminal $\overline{IRQ}$ 1 in FIG. 5. This causes MPU 80 to execute a jump to a predetermined memory location to begin execution of the instructions comprising the Interrupt Handler depicted in the flow chart of FIG. 6(b) and 6(c). As soon as the Interrupt Handler instructions have been executed, the machine automatically returns to the Main Routine.

Considering first the Main Routine shown in FIG. 6(a), upon power-up of the microprocessor in anticipation of performing the adaptive control algorithm of the present invention, the so-called Quarter Counts as well as the Error values and Cycle Index values are initialized. The main program loop in the Main Routine begins with the setting of the Quarter Index to zero. This Quarter Index value is incremented each time the interrupt routine is executed. Next, the Error value is also set to zero and then the Quarter Counts from a previous cycle are interchanged with those for the current cycle such that the value for the new prior fourth quarter, $\Delta t_{-4}$, becomes equal to the value for the first quarter of the just-completed cycle, $\Delta t_1$. The remaining Quarter Counts are updated in a similar manner. In mathematical notation, then, this updating may be expressed as follows:

| New Cycle | | Just Completed Cycle |
|---|---|---|
| $\Delta t_{-4}$ | = | $\Delta t_1$ |
| $\Delta t_{-3}$ | = | $\Delta t_2$ |
| $\Delta t_{-2}$ | = | $\Delta t_3$ |
| and | | |
| $\Delta t_{-1}$ | = | $\Delta t_4$ | where $\Delta t_i$ is the time required for the shaft to rotate through a predetermined number of complete revolutions and i is the quarter number counted from the beginning of the newly initiated cycle as indicated in FIG. 3.

Following this interchange operation, the next operation in the flow chart is the computation of the Cycle Index and the setting of the new Cycle Index flag if the new value of the Cycle Index is different from its prior value. The Cycle Index itself is calculated from the following set of equations:

$$\text{If } \frac{\Delta t_{-1}}{n} > T_1, \text{ then } n = 1$$

-continued $$\text{If } T_1 > \frac{\Delta t_{-1}}{n} > T_2, \text{ then } n = 2$$

$$\text{If } \frac{\Delta t_{-1}}{n} < T_2, \text{ then } n = 4$$

where $T_1$ and $T_2$ are the reciprocals of the rotational speeds at which n is incremented and n is the Cycle Index. It is to be understood that the use of the Cycle Index and its updating is optional to reduce the modulus of the counters employed and that it may be possible to use a constant Cycle Index. The next step is to decide if the curve fit method may be used to calculate the error. If the Cycle Index is the same as in the previous cycle, the new Cycle Index flag is set to zero and $\Delta t_{-4}$ and $\Delta t_{-1}$ may be used to start the error calculation. Then, the next step in the main program loop is to add the weighted error factors from the previous cycle $A\Delta t_{-4} + B\Delta t_{-1}$ to the accumulated error. If the new Cycle Index flag is set to 1 the last step is bypassed.

Next, the Main Routine waits until the Quarter Index becomes equal to three. When this happens, a data input operation is conducted whereby digital values indicative of load as well as digital values from any other sensors employed are inputed. For example, on a spark ignition engine, a knock sensor can be used to call for a retard bias sufficient to reduce the knock to an acceptable level. This operation is followed by a computation of cycle time which is simply expressed as:

$$\Delta t = 2(\Delta t_2 + \Delta t_3/n)$$

where n is the Cycle Index. The total cycle time is then referred to as $\Delta t$.

Once the cycle time has been computed, the bias factor is next computed. This may conveniently be accomplished through the use of a look-up table stored in the ROM Memory 84 (FIG. 5). That is to say, an engine load value, or cycle time, as well as possibly other factors obtained from suitable sensors, may be included in addressing a look-up table and a value is then extracted from the table and, when multiplied by the square of the cycle time, becomes the bias value which is added to the error, assuming that a bias correction is desired.

Now, no further computation takes place until the Quarter Index reaches four, at which point the correction is computed. The correction value may be proportional to the error or, alternatively, may merely be a positive or a negative correction of a fixed magnitude, depending upon whether the error is more positive than a small positive value for positive correction or more negative than a small negative value for a negative correction. The microprocessor then outputs a control signal to advance the engine parameter setting with the computed correction factor added in, and the operation loops back to its beginning where the Quarter Index is again set to zero and the error is set to zero, etc. Thus, when the timing is advanced, the dither amplitude plus the correction value is added to the previous value of the parameter setting.

Now that the Main Routine has been explained, consideration will be given to the Interrupt Handler. In this regard, reference is made to FIGS. 6(b) and 6(c) of the drawings. As has already been mentioned, the Interrupt Handler or routine is executed each time there is one complete revolution of the engine shaft as signaled by the creation of an interrupt by the mark detector 18–20 (FIG. 1). The first operation performed as a part of the Interrupt Handler is to increment the cycle count. Next, a test is made to determine whether the cycle count has become equal to the Cycle Index value. If not, the Interrupt Handler merely returns to the Main Routine. However, if the cycle count has become equal to the Cycle Index value, then the Interrupt Handler reads the time count from the interval counter of the computer and, at the same time, does the reinitialization of the counter, readying it for the receipt of subsequent high frequency clock pulses. This is followed by the incrementing of the Quarter Count. Following the incrementing of the Quarter Count, a test is made to determine whether the new count value is equal to two. If it is, it means that one-half of the dither period is completed and that the parameter setting should now be retarded as a part of the normal dithering cycle. The timing is actually retarded by subtracting the dither amplitude from the current value of the timing defined by the machine parameter control setting.

Following the midway shift in the dither signal from advance to retard, one of two possible computations is executed for updating the error value. Specifically, if the current Cycle Index is new or different from its previous value, then operation proceeds down the left-hand branch in the flow chart. First, a test is made to determine whether the Quarter Count is equal to one. If so, the time count is added to the accumulated error value with the time count being stored as the current value of $\Delta t_1$. If the Quarter Count is not equal to one, a further test is made to determine whether it is equal to two. If it is equal to two, then the time count is subtracted from the error and the time count value is stored away as $\Delta t_2$. If the Quarter Count is not equal to one or two, a test is made to see if it is equal to three and, if so, the time count value is subtracted from the error and that same time count value is stored away as $\Delta t_3$. Finally, if the Quarter Count is equal to four, then the time count is added to the accumulated error and this time count value is saved as $\Delta t_4$.

It was initially assumed that the Cycle Index was a new value. If, on the other hand, the Cycle Index is the same as the previous Cycle Index value, then operation proceeds down the right-hand branch of the flow chart and the error is calculated in a slightly different fashion. Specifically, if the Quarter Count is tested and found to be equal to one, then a weighted time count is added to the accumulated error. The weighted count is equal to a constant factor C multiplied by the current time count $\Delta t_1$.

If the Quarter Count is equal to two, the error is updated by subtracting the current time count from the accumulated error with the time count being saved as $\Delta t_2$. If the Quarter Count had been equal to three, then the error is updated by subtracting the time count from the accumulated error and the time count value is again stored away for later reference as $\Delta t_3$.

Lastly, if the Quarter Count is equal to four, a weighted time count is added to the accumulated error value with the weighted time count being of the form of D. $\Delta t_4$ and that time count is saved for later use in program execution. Irrespective of whether the left-hand branch or right-hand branch of the Interrupt Handler is followed, at the completion of the Quarter Count equal four test and the resulting operation, the program returns to the Main Routine.

The flow charts of FIG. 6 illustrate only one way in which the present invention may be implemented by appropriately programming a general purpose microprocessor. Those skilled in the art having the foregoing flow charts before them will be in a position to write an assembler code for the microprocessor to generate the detailed machine code. Hence, it is deemed unnecessary to set forth the instruction listings themselves.

FIGS. 8(a) through 8(f) illustrate the results of a computer simulation of the control system of the present invention as applied to the injection timing of a diesel engine. In each instance, a plot has been obtained of the variations in timing error and in absolute timing for changes in engine speed as reflected by the lowermost curve in each of the figures. When these curves are compared to those of FIG. 7 which, as mentioned, pertain to the prior art, it is immediately noted that the wandering of the control at low RPM is substantially eliminated. Similarly, there is much less variation in both absolute timing and in timing error when the synchronous dithering approach of the present invention is employed. In both systems, however, sudden changes in speed result in the introduction of a transient but, when comparing the curves of FIGS. 8(a) through 8(f) with those of FIGS. 7(a) and 7(b), it is immediately apparent that the transient dies out much more rapidly when the system of the present invention is employed as the control mechanism.

The effects of variations in the frequency of the clock used to define the shaft speed in the four quadrants of the dither cycle can be observed by comparing FIG. 8(a) with FIG. 8(b). The curves represented in FIG. 8(a) were obtained when a 1 MHz clock source was used to supply pulses to a counter during the four segments of the dither period. In FIG. 8(b), however, a 10 MHz clock source was employed. It is apparent from this comparison that the higher clock rate serves to decrease the variations in timing error over and above the error which is attributable to the dithering of the control parameter itself. The effect of clock rate is even more apparent in the curves of FIGS. 8(c) where the computer simulation was made to simulate the effects of increasing the clock oscillator frequency to 100 GHz.

FIG. 8(d) shows the effect of bias on the timing. Rather than being centered about the 10° advance position the timing is shifted by approximately $2\frac{1}{2}°$ toward TDC. Similarly, the timing error is no longer centered about the zero value but, instead, is displaced approximately $2\frac{1}{2}$ crank angle degrees negative. The curves of FIG. 8(d) were obtained using a 10 MHz clock frequency.

Figure 8E:
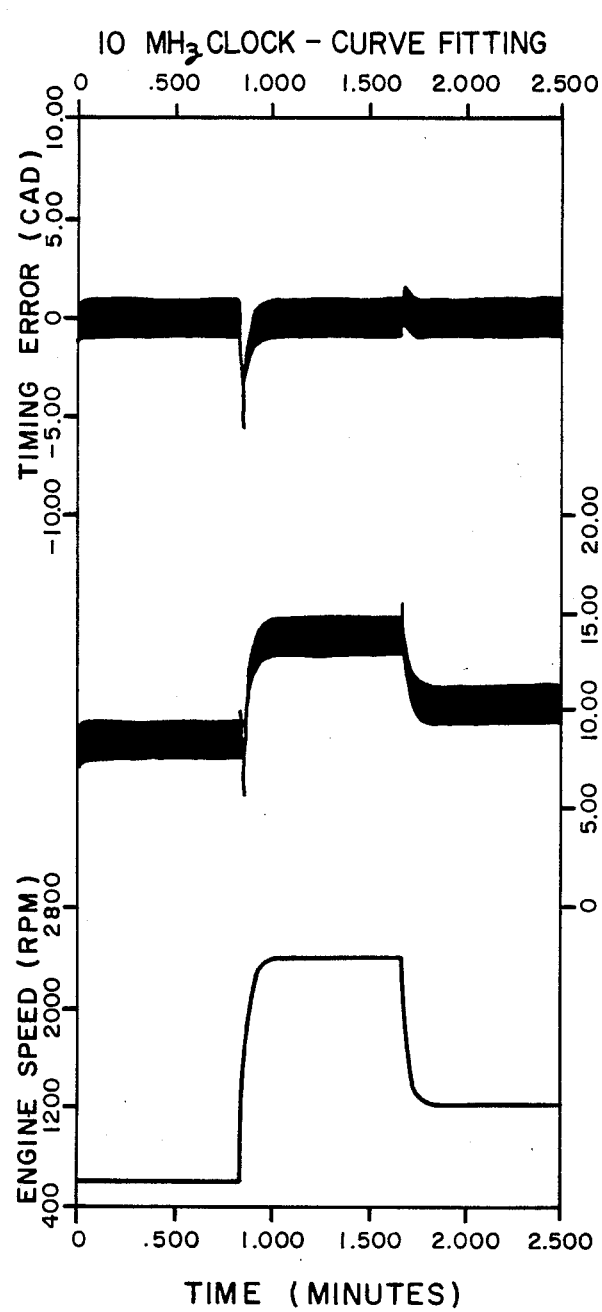

The plots of FIG. 8(e) were obtained using a 10 MHz clock rate and proportional control wherein a curve fitting approach is utilized. Except for the transient errors resulting from rapid acceleration and deceleration, the timing error variations are all but eliminated as evidenced by the lack of variation in height of the timing error plot (except at the points of acceleration and deceleration).

Figure 8F:
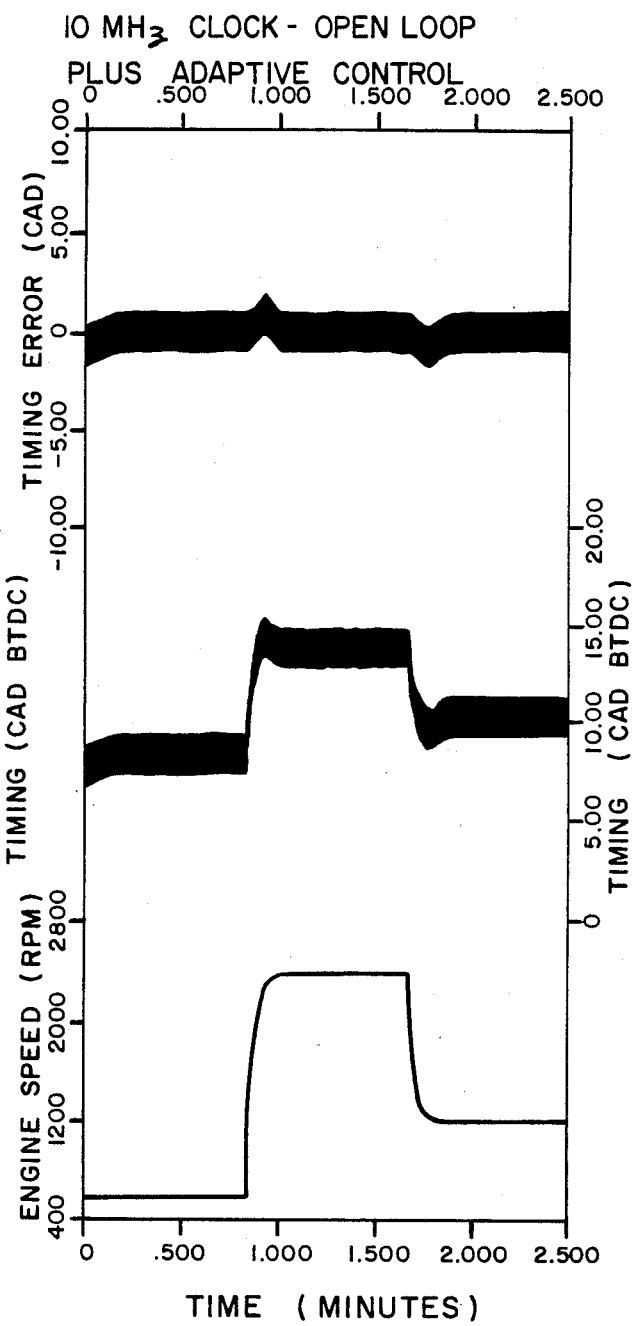

Finally, the curves of FIG. 8(f) were taken with the assumption that the adaptive control system of the present invention is used in conjunction with an open-loop controller of a type commonly found on internal combustion engines. With a dither amplitude of approximately 0.025 CAD and with a 10 MHz clock frequency, the combined control was such that the timing error was limited to that introduced by the dithering itself and that the system serves to hold control at the desired zero error state over the full range of speed variations.

The manner in which timing characteristics of individual injectors in a multicylindered diesel may be determined using the optimization technique of the present invention will now be described. First, the fuel injection control system is set to operate the engine at a constant fueling rate. Next, the timing of an individual injector is dithered in synchronism with the rotation of the crank shaft. While the one injector is being worked up, the timing of the other injectors is fixed. In accordance with the dithering mode, the timing of the selected injector is advanced during the first half of the dither cycle and retarded by an equal amount in the second half, all as is indicated in FIG. 3. Each half of the dither cycle is made to comprise an equal rotation of the crank shaft. Preferably, at least two engine cycles (four revolutions for a four-stroke cycle engine) are included in each half cycle of the dither period. If the timing of actual fuel flow from the injector is retarded of MBT, engine speed will be seen to increase when the inject time is advanced, and decreased when the inject time is retarded. Similarly, if the inject time is advanced of MBT, the reverse will occur and the speed will vary as is shown in curve 38 of FIG. 3. The logic of the control mechanism will advance the timing if the speed variation is as shown in curve 36 and retarded if the variation is as shown in curve 38. Thus, the timing will always be moved toward MBT.

An inspection of the speed curves of FIG. 3 shows that timing should be advanced if speed in the central portion of the dither cycle, i.e., from $-2n$ to $+2n$ is higher than the outer edges of the dither cycle, i.e., from $-4n$ to $-2n$ and from $+2n$ to $+4n$. Contrariwise, if the speed in the central portions is lower than in the outer edge portions of the dither cycle, then timing of the injector flow should be retarded. Again, one way of implementing this logic is to determine the error signal in accordance with the error equation (1). A positive value of E indicates that the timing should be advanced, while a negative value indicates that the timing should be retarded. Thus, at the end of each dither cycle, a timing correction is added in addition to the normal dithering of the timing. The correction may be of a constant magnitude, and in the advance direction for positive E or in the retard direction for negative E. It is also possible to make the degree of correction proportional to the magnitude of the error signal, E.

For this system to work properly, the dither period must be synchronized with the engine's firing pulses. If it is not so synchronized, it is possible for the MBT seeking logic to confuse speed variations associated with engine firing pulses with speed changes due to dithering of the timing of an individual injector. Furthermore, since only a single injector is being dithered at any one time during the calibration phase, each quarter of the dither cycle should contain at least one complete engine cycle so that the injector is certain to have been fired at least once in every quarter.

As with the overall system for optimizing the timing of the entire engine already described, individual injector calibration may be attained using either a discrete digital electronic implementation or a properly programmed microprocessor system. In either event, the dither cycle is initiated by a pulse indicating the passage of a reference mark on the flywheel past a stationary sensor. A timer is initiated with the detection of the mark and is made to run for two revolutions until the mark on the flywheel passes the sensor for the second time. The average time for this first quarter is then used to calculate $\Delta t_1$ of the aforementioned error equation. The time for the second two revolutions is then measured in the same fashion so that the value $\Delta t_2$ can be determined. The passage of the timing mark at the end of the second quarter is also used to signal that the timing should be retarded to initiate the second half of the dither cycle (see FIG. 3). Suitable timers are then used in the same manner to measure the time for the other four revolutions occurring during the dither cycle to thus determine the factors $\Delta t_3$ and $\Delta t_4$. These four rotation time components are then used to calculate E and to determine if an advance or retard timing correction should be added at the end of the dither cycle. This process is continued until MBT timing is approached. A suitable test is incorporated into either the discrete logic or into the software controlling the microprocessor for indicating when the system has converged upon the MBT point. This timing is then averaged over several cycles and recorded and gives a measure of the MBT timing of a given injector. The same process is performed for each engine injector seritum.

Once each of the injectors has been subjected to the control algorithm of the present invention, the individual injector MBT timing values are converted into relative timing of the injectors. This then reflects their relative electrical and mechanical delay characteristics. Knowing the individual values permits initialization or calibration of the timing control system associated with the injectors to the individual characteristics of the injectors themselves.

The foregoing procedure may be employed whenever the system must be recalibrated and may be initiated either manually or automatically. Once calibrated, however, the system is switched back to normal timing control already described. Of this point, cylinder-to-cylinder timing differences have been substantially eliminated because of the preliminary calibration procedure on the individual injectors, one at a time.

In the same fashion that it is possible to introduce bias so as to cause overall operation away from MBT by predetermined amounts as was previously explained, it can also be employed during the calibration phase where the injectors of a diesel engine are operated upon individually to determine their respective variations. In that the speed vs. timing curve is somewhat steeper as timing moves away from MBT, the use of biasing to obtain a larger value of E and thus make the system more sensitive may be expedient.

The invention has been described herein in considerable detail in order to comply with the Patent Statutes and to provide those skilled in the art with the information needed to apply the novel principles, and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. An adaptive electronic control system for maximizing the performance of a power producing machine for given settings of a machine performance modifying parameter, comprising:
   (a) shaft rotation sensing means coupled to said machine for sensing complete rotations of the output shaft of said machine with respect to a fixed reference point;

(b) means coupled to said shaft rotation sensing means for symmetrically reciprocally moving the setting of said machine performance modifying parameter back and forth about said given setting in synchronism with the angular rotation of said output shaft during successive integral engine cycles;

(c) speed determining means coupled to said shaft rotation sensing means for defining the average speed of rotation of said output shaft in plural segments of the period of symmetrical reciprocal movement of said setting about said given setting;

(d) computing means for determining the weighted difference between said average speeds in first ones of said plural segments and in second ones of said plural segments, the weighting factor being a function of the acceleration of said output shaft; and (e) means for adjusting said given setting in accordance with said weighted difference in average speeds.

2. The adaptive electronic control system as in claim 1 wherein each phase of said period of symmetrical reciprocal movement of said setting includes an equal number of machine cylinder firing pulses and is in synchronism with said cylinder firing pulses.

3. The adaptive electronic control system as in claim 1 wherein said shaft rotation sensing means comprises means for producing one electrical pulse for each 360° rotation of said shaft.

4. The adaptive control system as in claim 3 wherein said means for producing an electrical pulse includes:
(a) means secured to said shaft and rotatable therewith;
(b) a mark element disposed on said means secured to said shaft and rotatable therewith; and
(c) a mark sensing means fixedly mounted proximate the periphery of said means secured to said shaft.

5. The adaptive control system as in claim 1 wherein said computing means includes biasing means for modifying said weighted difference whereby said machine setting is held in a predetermined relationship with respect to the MBT setting.

6. The adaptive control system as in claim 5 wherein said biasing means comprises:
(a) memory means operatively coupled to said computing means and adapted to store predetermined operands at addressable locations therein;
(b) addressing means associated with said speed determining means for selectively reading said operands from said memory means;
(c) means including said computing means for forming the product of said operand and a factor proportional to the square of the engine's cycle time; and
(d) means for adding said product to said weighted difference between the average speeds in first ones of said plural segments and in second ones of said plural segments.

7. The adaptive control system as in claim 5 wherein said computing means includes a programmed microprocessor.

8. The adaptive control system as in claim 5 wherein said biasing means comprises:
(a) memory means operatively coupled to said computing means and adapted to store predetermined operands at addressable locations therein;
(b) addressing means associated with said speed determining means for selectively reading said operands from said memory means;
(c) means including said computing means for forming the product of said operand and a factor proportional to the square of the engine's cycle times; and
(d) means for adding said product to said weighted difference between the average speeds in first ones of said plural segments and in second ones of said plural segments.

9. The adaptive control system as in claim 1 wherein said means for oscillating and said means for adjusting said given setting comprise signal responsive means coupled to said computing means.

10. The adaptive control system as in claim 1 wherein said speed determining means comprises:
(a) a source of regularly occurring clock pulses;
(b) counting means; and
(c) means coupling said source of regularly occurring clock pulses to said counting means whereby those clock pulses occurring during predetermined rotations of said output shaft are accumulated in said counting means.

11. The adaptive control system as in claim 10 wherein said computing means includes:
(a) digital adding means coupled to said counting means for periodically forming sum values of the pulses accumulated in said counting means; and
(b) digital subtracting means coupled to receive the output from said digital adding means for periodically generating a digital value representative of the algebraic difference between the said sum values.

12. The adaptive control system as in claim 11 wherein said counting means, said digital adding means and said digital subtracting means are controlled by said shaft rotation sensing means.

13. The adaptive control system as in claim 10 and further including cycle index means responsive to the rotational speed of said shaft for increasing the number of said predetermined rotations of said output shaft during which said clock pulses are accummulated in said counting means.

14. The adaptive electronic control system of claim 1 wherein said machine performance modifying parameter comprises the start-of-inject time of at least one of a plurality of engine fuel injectors.

15. The adaptive electronic control system of claim 1 wherein said plural segments of the period of symmetrical reciprocal movement of said setting include segments from a preceding and current cycles of said reciprocal movements of said setting.

16. The adaptive electronic control system of claim 15 and further including means responsive to rate of change of engine speed for controlling the inclusion of segments from a preceding and current cycles of said reciprocal movements.

17. An adaptive electronic control system for maximizing the performance of a power producing machine for given settings of a machine performance modifying parameter, comprising:
(a) shaft rotation sensing means coupled to said machine for sensing complete revolutions of the output shaft of said machine;
(b) means coupled to said shaft rotation sensing means for reciprocally moving the setting of said machine performance modifying parameter back and forth about said given setting in synchronism with the angular rotation of said output shaft, the time period of the reciprocating movement of said setting being divided into quarters;

(c) rotation time determining means coupled to said shaft rotating sensing means for defining the average time of rotation of said output shaft in each of said quarters;

(d) computing means for determining the weighted difference between the average rotational time in first ones of said quarters and in second ones of said quarters; and (e) means for adjusting said given setting in accordance with said difference.

18. The adaptive electronic control system as in claim 17 wherein each phase of said time of reciprocating movement of said setting includes an equal number of machine cylinder firing pulses and is in synchronism with said cylinder firing pulses.

19. The adaptive electronic control system as in claim 17 wherein said shaft rotation sensing means comprises means for producing an electrical pulse each time said shaft rotates through 360°.

20. A method for maximizing the performance of a power-producing machine for given settings of a machine performance modifying parameter, comprising the steps of:

(a) sensing integral rotations of the output shaft of said machine;

(b) symmetrically reciprocally moving the setting of said parameter back and forth about said given setting in timed synchronism with the angular rotation of said output shaft;

(c) determining the average speed of rotation of said output shaft in plural quarter segments of the movement cycle of said setting;

(d) determining the weighted difference between average speeds in first ones and second ones of said plural quarter segments; and (e) adjusting said given setting as a function of said difference.

21. A method of calibrating the fuel injection timing control of an internal combustion engine, comprising the steps of:

(a) sensing integral rotations of the output shaft of said engine;

(b) cyclicly advancing and retarding the start-of-inject time of at least one of said injectors back and forth about a given setting of said timing control in synchronism with the angular rotation of said output shaft;

(c) determining the average speed of rotation of said output shaft in plural segments of the cycle of advancing and retarding of said setting;

(d) determining the weighted difference between average speeds in first ones and second ones of said plural segments; and (e) adjusting said given setting as a function of said difference.

22. A method of phasing the commencement timing of the fuel injections for a multi-cylinder engine, comprising the steps of:

(a) sensing integral revolutions of the output shaft of said engine;

(b) individually varying the start-of-inject time of one of a plurality of fuel injectors cyclically and symmetrically about a given time setting in synchronism with said integral revolutions of said output shaft;

(c) determining the average time of rotation of said output shaft during plural quarter segments of the period of the cyclic variations of said time setting;

(d) computing the weighted difference between the average shaft rotational time in first ones and in second ones of said plural quarter segments;

(e) adjusting said given time setting in accordance with the computed weighted difference;

(f) recording the start-of-inject time value corresponding to a predetermined value relative to that for maximum brake torque; and (g) repeating steps (a) through (f) for each engine fuel injector.

23. The method for phasing the timing of fuel injectors as in claim 22 and further including the steps of:

(a) determining the deviations in timing value of all other injectors from that of a predetermined one of said injectors;

(b) converting said deviations to time measurements; and (c) applying said time measurements to an engine performance modifying control system.

* * * * *